S. BERMAN.
CASTER FOR SHOW CASES.
APPLICATION FILED NOV. 8, 1920.

1,426,452.

Patented Aug. 22, 1922.

Inventor.
Sam Berman.
By Dabel & Mueller attys.

UNITED STATES PATENT OFFICE.

SAM BERMAN, OF CHICAGO, ILLINOIS.

CASTER FOR SHOW CASES.

1,426,452.  Specification of Letters Patent.  Patented Aug. 22, 1922.

Application filed November 8, 1920. Serial No. 422,567.

*To all whom it may concern:*

Be it known that I, SAM BERMAN, a subject of Russia (having declared his intention to become a citizen of the United States), residing at Chicago, in the county of Cook and State of Illinois, have invented a certain new and useful Improvement in Casters for Show Cases, of which the following is a full, clear, concise, and exact description, reference being had to the accompanying drawings, forming a part of this specification.

This invention relates to casters and more particularly to a caster or roller for sliding doors such as are used on show cases and similar devices.

It is a purpose of this invention to provide a ball bearing caster or roller that can be simply and cheaply made and which will operate easily.

It is a further purpose of the invention to provide a ball bearing caster that has a two part casing provided with diverging prongs that can be readily inserted in the material of the member carrying the caster, and a solid shaft for said caster connecting said parts of said casing and provided with means for spacing said parts, said shaft carrying an inner bearing ring for the bearing balls, which are located between said inner bearing ring and an outer ring serving as the roller or track engaging member of the caster.

Other objects and advantages of the invention will appear as the description of the accompanying drawings, showing one form that my invention may take proceeds. However, I desire to have it distinctly understood that I do not intend to limit myself to the exact details of structure shown in the drawings or described in the specification, but desire to include as part of my invention all such obvious changes and modifications of structure as would occur to a person skilled in this art, and as would fall within the scope of the claims.

Figure 1:
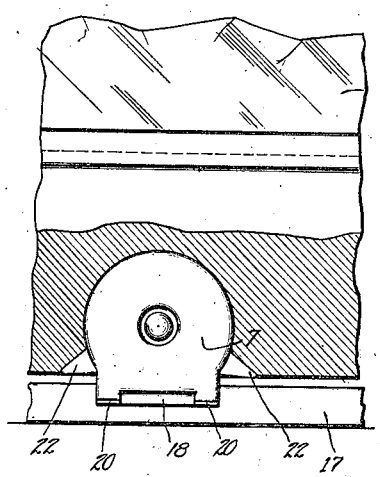
Fig. 1 is a side elevation, partly broken away of a portion of a show case or similar member, showing one of the improved casters in position therein, and engaging a rail upon which the same is adapted to roll.
Figure 2:
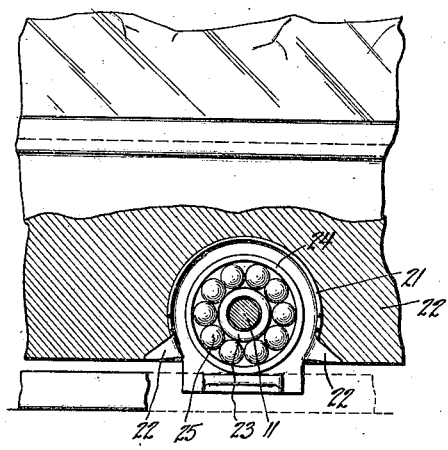
Fig. 2 is a similar view showing a central longitudinal section of the caster or roller.
Figure 3:
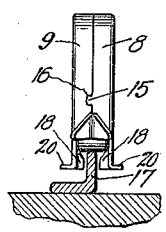
Fig. 3 is an edge elevation of the caster showing the same in engagement with a rail.
Figure 4:
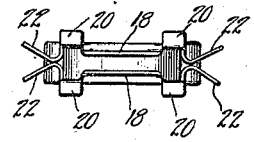
Fig. 4 is an edge view of the caster viewed from the open end of the casing.
Figure 5:
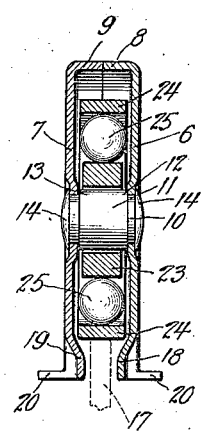
Fig. 5 is a transverse section of the caster.

Referring in detail to the drawings, the improved caster is shown as having a casing comprising the sheet metal parts 6 and 7 which are correspondingly shaped to provide a recess within the same to carry the roller or track engaging member and associated parts. The edge portions of the casing parts 6 and 7 are provided with flanges 8 and 9 at the inner portions thereof to space the same. The casing parts 6 and 7 are secured together by means of the axle 10 having the central enlarged portion 11 providing the shoulders 12 and 13 to properly space the members 6 and 7, the end portions of the axle being riveted over or headed as at 14 to secure the casing parts 6 and 7 together. Each of the casing parts is provided with a tongue 15 that seats in a recess 16 of the other part in order to properly align the parts when being assembled. One side of the casing is open in order to receive the track 17, the casing being provided with flanges 18 and 19 in the open portion thereof to act as guide members to engage the rail. The casing is also provided with right angularly extending tongues or projections 20 to act as stops to engage the edge portion of the member within which the casing is seated. The caster is seated within a recess 21 in the sliding door of the show case or other member on which the caster or roller is employed, and the halves 6 and 7 are provided with diverging prongs 22 which are tapered as will be clear from Figs. 1 and 2, and which are adapted to be driven into the material of the sliding door to firmly hold the casing and roller within the same in position in the door.

Mounted on the axle 11 and free to turn thereon is the ring 23, and mounted in spaced relation thereto and within the casing of the caster is the ring 24, which is adapted to engage the track 17 and roll thereon. Between the rings 23 and 24 are mounted the bearing balls 25, thus providing a ball bearing caster that will roll easily and smoothly, and which can be cheaply made and securely placed in position in the member that is to carry the same.

Having thus described my invention what

I desire to claim and secure by U. S. Letters Patent is:

1. A device of the character described comprising a two part casing, a solid axle connecting and securing said casing parts together, said axle being provided with an integral enlarged central portion, providing shoulders for spacing said casing parts in definite relationship, a ring loosely mounted on said axle within said casing to provide play between said ring and axle, a second ring mounted within said casing in spaced relation to said first mentioned ring, and bearing balls mounted in said casing and between said rings, said casing substantially enclosing the movable parts of the device, the ends of said shaft being riveted over to secure the casing parts together, said casing being provided with spaced depressed portions for receiving the rivet heads, said depressed portions forming inwardly extending projections engaging the shoulders on said axle to space said casing parts.

2. A device of the character described comprising a two part casing, a solid axle connecting and securing said casing parts together, said axle being provided with an integral enlarged central portion, providing shoulders for spacing said casing parts in definite relationship, a ring loosely mounted on said axle within said casing to provide play between said ring and axle, a second ring mounted within said casing in spaced relation to said first mentioned ring and in alignment with said enlargement, and bearing balls mounted in said casing and between said rings, said casing substantially enclosing the movable parts of the device, the ends of said shaft being riveted over to secure the casing parts together, said casing being provided with depressed portions for receiving the rivet heads and with holding prongs diverging obliquely to the central plane of said device, said depressed portions forming inwardly extending portions engaging the shoulders on said axle to space said casing parts.

In witness whereof, I hereunto subscribe my name this 2nd day of November A. D. 1920.

SAM BERMAN.